(12) United States Patent
Waldrop, III

(10) Patent No.: US 6,337,294 B1
(45) Date of Patent: *Jan. 8, 2002

(54) ELASTIC GROUND PLANE

(75) Inventor: John Cleveland Waldrop, III, Madrid (ES)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/443,740

(22) Filed: Nov. 19, 1999

Related U.S. Application Data

(62) Division of application No. 08/718,771, filed on Sep. 24, 1996, now Pat. No. 6,048,581.

(51) Int. Cl.$^7$ ................................................ B32B 27/12
(52) U.S. Cl. ........................ 442/71; 442/117; 442/180; 442/304; 442/317
(58) Field of Search .................. 442/71, 180, 117, 442/304, 317

(56) References Cited

U.S. PATENT DOCUMENTS

| | | |
|---|---|---|
| 1,942,867 A | 1/1934 | Leguillon |
| 2,152,029 A | 3/1939 | Cone |
| 2,173,262 A | 9/1939 | Monegan et al. |
| 2,368,702 A | 2/1945 | Bourne |
| 2,504,684 A | 4/1950 | Harper |
| 2,716,460 A | 8/1955 | Young |
| 2,731,221 A | 1/1956 | Holton |
| 3,586,267 A | 6/1971 | Ingelman-Sundberg ...... 244/42 |
| 4,296,900 A | 10/1981 | Krall ............................ 244/219 |
| 4,427,169 A | 1/1984 | Brown ......................... 244/219 |
| 4,429,844 A | 2/1984 | Brown et al. ................ 244/219 |
| 4,461,611 A | 7/1984 | Michel ......................... 416/24 |
| 4,706,913 A | 11/1987 | Cole ............................ 244/214 |
| 4,892,626 A | 1/1990 | Covey .......................... 204/15 |
| 4,966,802 A | 10/1990 | Hertzberg .................... 428/119 |
| 5,094,412 A | 3/1992 | Narramore .................. 244/214 |
| 5,222,699 A | 6/1993 | Albach et al. ............... 244/213 |
| 5,288,039 A | 2/1994 | DeLaurier et al. .......... 244/219 |
| 5,326,050 A | 7/1994 | Zell ........................... 244/75 R |
| 5,367,970 A | 11/1994 | Beauchamp et al. ........ 114/140 |
| 5,374,011 A | 12/1994 | Lazarus et al. ............ 244/75 R |
| 5,481,184 A | 1/1996 | Jacobsen ..................... 324/106 |
| 5,487,351 A | 1/1996 | Nedderman, Jr. ............ 114/332 |
| 5,639,215 A | 6/1997 | Yamakawa et al. ........... 416/23 |
| 5,662,294 A | 9/1997 | MacLean et al. ........... 244/219 |
| 5,700,337 A | 12/1997 | Jacobs et al. .................. 186/64 |
| 5,794,893 A | 8/1998 | Diller et al. ................. 246/213 |
| 5,803,405 A | 9/1998 | Ellis et al. ................... 244/130 |
| 5,806,808 A | 9/1998 | O'Neil ........................ 244/213 |
| 5,839,700 A | 11/1998 | Nedderman, Jr. ........... 244/219 |
| 5,892,877 A | * 4/1999 | Meyerhoefer ............... 385/136 |
| 5,896,191 A | 4/1999 | Beier et al. ................. 356/355 |
| 5,918,834 A | 7/1999 | Sommer et al. .......... 244/129.1 |
| 5,927,651 A | 7/1999 | Geders et al. ............ 244/35 R |
| 5,947,417 A | 9/1999 | Cameron .................. 244/129.5 |
| 5,947,422 A | 9/1999 | Wille .......................... 244/219 |
| 5,958,803 A | * 9/1999 | Geiger .......................... 442/71 |
| 5,975,463 A | * 11/1999 | Gruensfelder et al. ... 244/118.1 |
| 5,979,828 A | * 11/1999 | Gruensfelder et al. ... 244/129.1 |
| 6,027,074 A | * 2/2000 | Cameron et al. ............ 244/133 |
| 6,048,581 A | * 4/2000 | Waldrop, III ............... 427/412 |
| 6,068,215 A | * 5/2000 | Gruensfelder et al. ... 244/129.5 |
| 6,076,766 A | * 6/2000 | Gruensfelder ................ 244/49 |
| 6,079,667 A | * 6/2000 | Gruensfelder ................ 244/60 |
| 6,089,505 A | * 7/2000 | Gruensfelder et al. .... 244/53 B |
| 6,092,764 A | * 7/2000 | Gruensfelder et al. ...... 244/130 |

* cited by examiner

*Primary Examiner*—Cathy Lam
(74) *Attorney, Agent, or Firm*—Harness Dickey & Pierce P.L.C.

(57) ABSTRACT

An elastic ground plane (50) has an environmental coating (58) attached to a surface of a fabric (54) having a plurality of fibers. A conductive substance (56) is applied to the fabric (54) to coat the fabric (54).

30 Claims, 3 Drawing Sheets

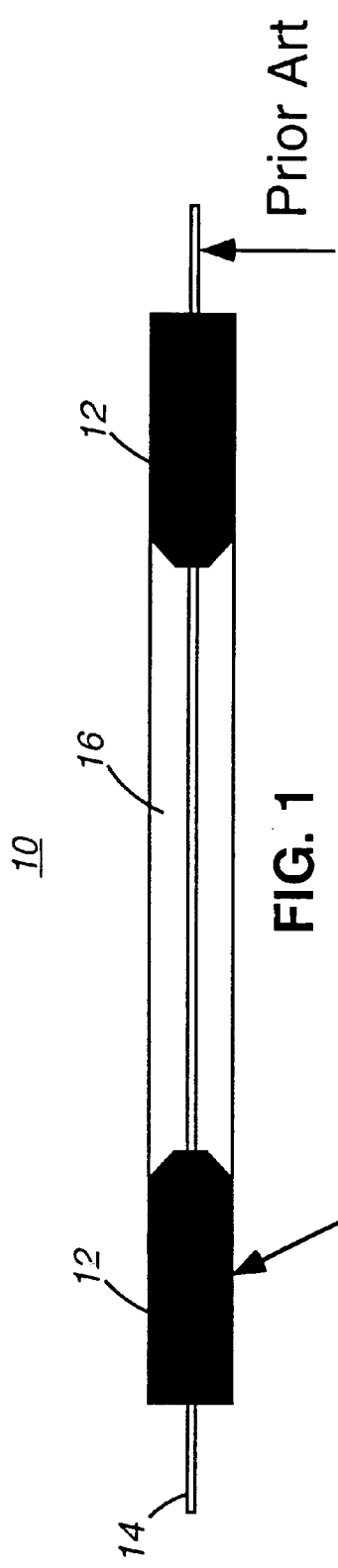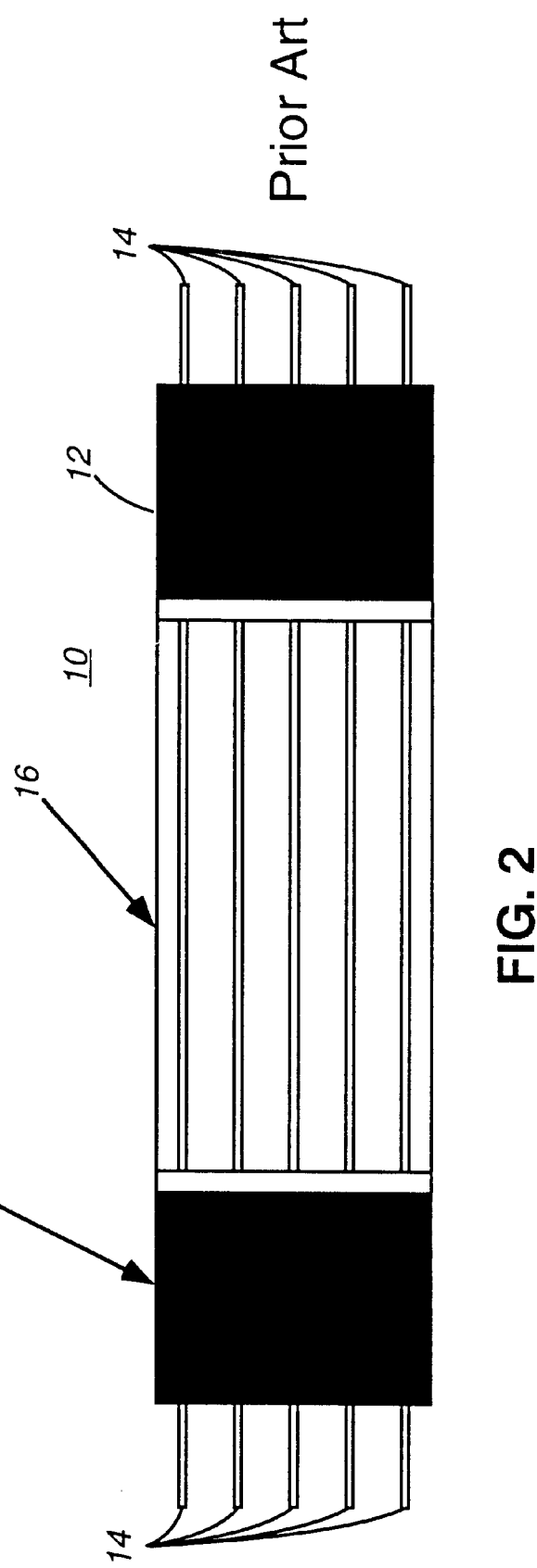

ELASTIC GROUND PLANE

This application is a divisional application of Ser. No. 08/718,771, filed on Sep. 24, 1996, now U.S. Pat. No. 6,048,581.

FIELD OF THE INVENTION

The present invention relates generally to the field of stretchable fabrics and more particularly to an elastic ground plane and method.

BACKGROUND OF THE INVENTION

Continuous moldline technology using reinforced elastomers presents an opportunity to improve upon many of the performance characteristics of aircraft and missiles. FIG. 1 shows a side view of a rod reinforced elastomer of the prior art. FIG. 2 is a top view of the rod reinforced elastomer of FIG. 1. The rod reinforced elastomer 10 has a pair of rod blocks 12. A plurality of rods 14 anchored to one of the pair of rod blocks 12 slide inside an elastomer panel 16. The rod reinforced elastomer 10 is capable of both elongation and deflection, as shown in FIG. 3. The rod reinforced elastomer has resting length 22 that can be stretched to an elongated length 24 and deflected a distance 26. These products can be used in applications such as control surfaces and in expandable bays to provide cleaner airflow and reduced drag. However, these products so far have been limited to non-metallic elastomeric compounds that provide little to no protection against electromagnetic interference (EMI). EMI can cause aircraft instruments to malfunction and can result in navigational errors and even the loss of the aircraft.

Conventional EMI shields have been designed as highly conductive metal strips, sprays, and panels that do not possess the ability to flex or elongate repeatedly without material degradation. Recent advances have produced foils that allow a continuous metallic surface with the ability to flex to various shapes. Unfortunately, these foils are limited to applications where elongation is less 10%.

Thus there exists a need for a material that can easily and significantly elongate in all directions, is highly conductive in all states of elongation, can withstand repeated elongations with no degradation in shielding effectiveness or material properties, is thin and light weight, and which is tough enough to withstand severe aerospace environments.

SUMMARY OF THE INVENTION

An elastic ground plane that overcomes these and other problems has an environmental coating attached to a surface of a fabric having a plurality of fibers. A conductive substance is applied to the fabric to coat the fabric.

BRIEF DESCRIPTION OF THE DRAWINGS

FIG. 1 is a side view of a prior art rod reinforced elastomer;

FIG. 2 is a top view of the rod reinforced elastomer of FIG. 1;

DETAILED DESCRIPTION OF THE DRAWINGS

Figure 4:
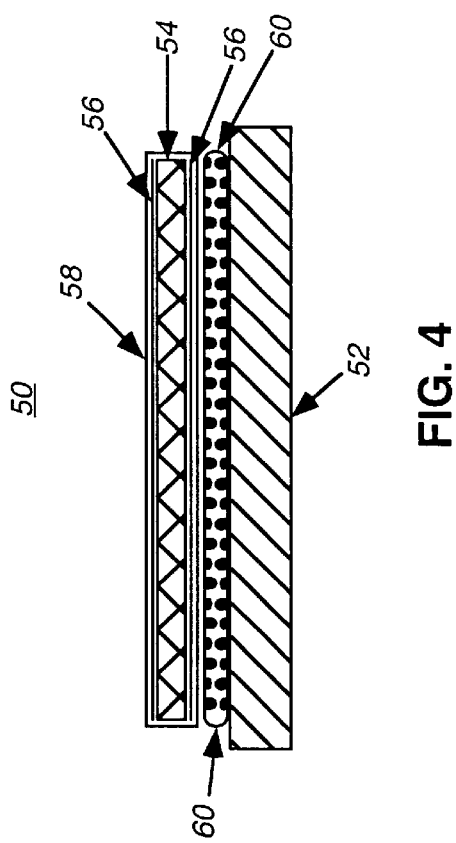
FIG. 4 is a side view of an embodiment of an elastic ground plane.

An embodiment of an elastic ground plane (elastic conductive material) 50 attached to a surface 52 is shown in FIG. 4. The surface 52 could be the rod reinforced elastomer discussed above. Alternatively, the surface could be any surface needing EMI shielding, particularly any surface that tends to stretch or elongate. The elastic ground plane 50 has a fabric 54 containing a plurality of fibers. In one embodiment the fabric is a warp knit fabric (warp knit style weave) made from polyamide NYLON fibers. In addition the fabric may contain a small amount of elastic polyurethane fiber (e.g., approximately 10%). The polyurethane or other elastic fiber assists in the recovery of the material after stretching. Note that the invention is not limited to NYLON or to warp knit weave as other materials and weaves are available. For instance, tubular knit weaves or other weaves that permit reversible elongation without permanent deformation or fabric damage can be used and higher temperature resistant materials such as super polyamide, glass, and quartz fibers can be knit when necessary for increased thermal performance. The fabric 54 is coated with a conductive substance by electrolessly plating the fabric 54 in one embodiment. The electroless plating deposits from five to forty percent (by weight) silver, nickel, copper, tin or other metal or combination of metals 56 on the fabric 54. In another embodiment each of the plurality of fibers forming the fabric (plane) 54 are electrolessly plated and then woven. An environmental coating 58 is then applied over the fabric 54. The environmental coating 58 is an elastomeric coating (elastomer) which can be in the form of fluorosilicones, fluoroelastomers, silicones, thermoplastic elastomers, urethanes or other viable elastic materials. An elastomeric adhesive (adhesive) 60 is applied to a side of the environmental coating 58 to attach the elastic ground plane to the surface 52.

Tests have shown that the elastic ground plane is capable of a minimum of 100% elongation in all directions at the required operating temperature (operating range) (e.g., −65° to 250° Fahrenheit). The elastic ground plane has a resistance of less than 0.8 Ohms per square, even when elongated and after repeated high strain loading conditions, providing an excellent ground plane. The tensile moduli for the material is less than 1,000 pounds per square inch (PSI) over the operating conditions. A low tensile moduli is important when the elastic ground plane is placed on a rod reinforced elastomer. The low tensile moduli allows the rod reinforced elastomer to be elongated and deflected without requiring a large force to drive the rod reinforced elastomer. Placing the elastic ground plane over the rod reinforced elastomer also increases the tear resistance of the elastomer by two and half times.

Figure 3:
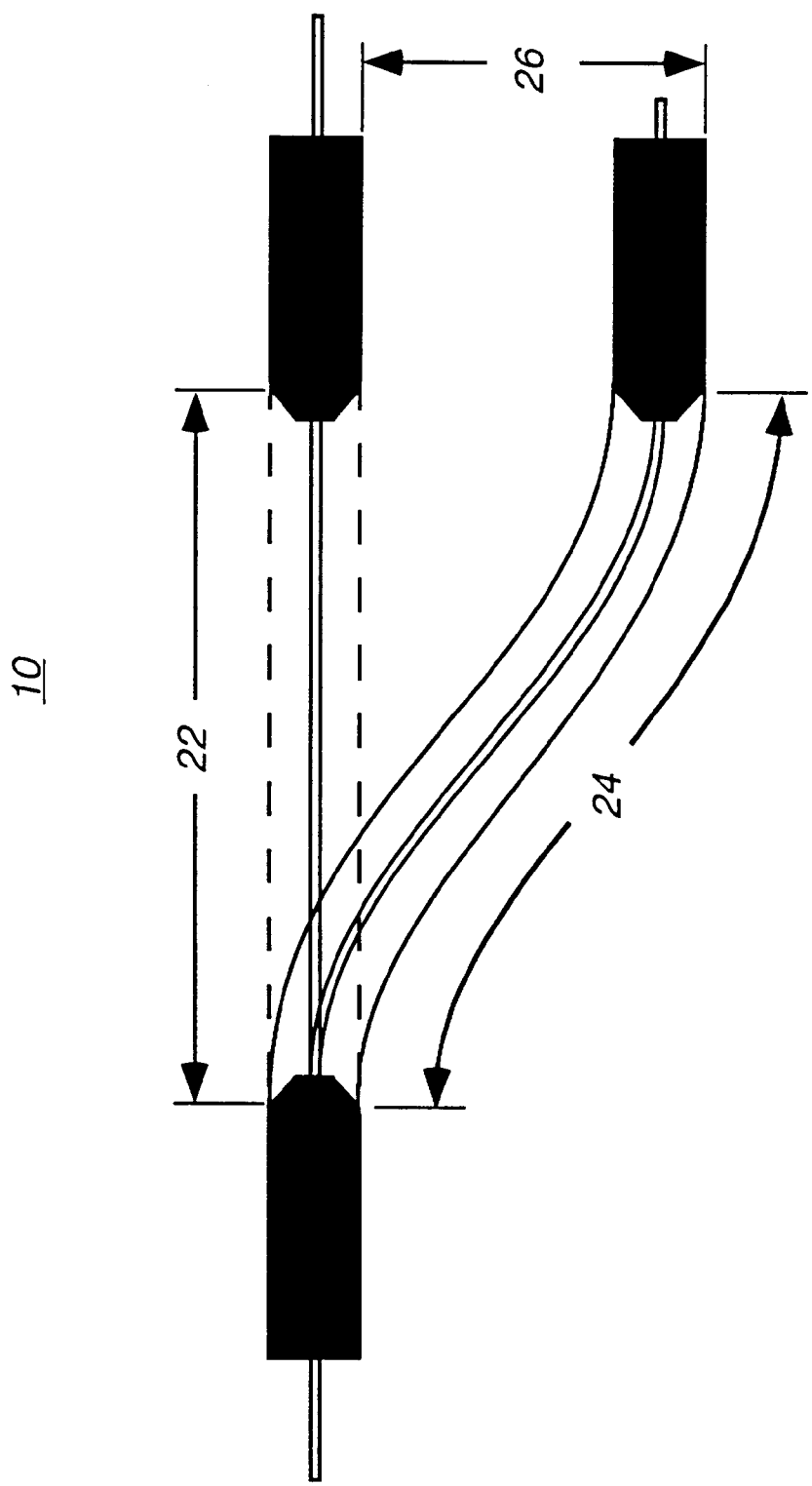
FIG. 3 is a side view of the rod reinforced elastomer of FIG. 1 in an elongated and deflected state.
Figure 6:
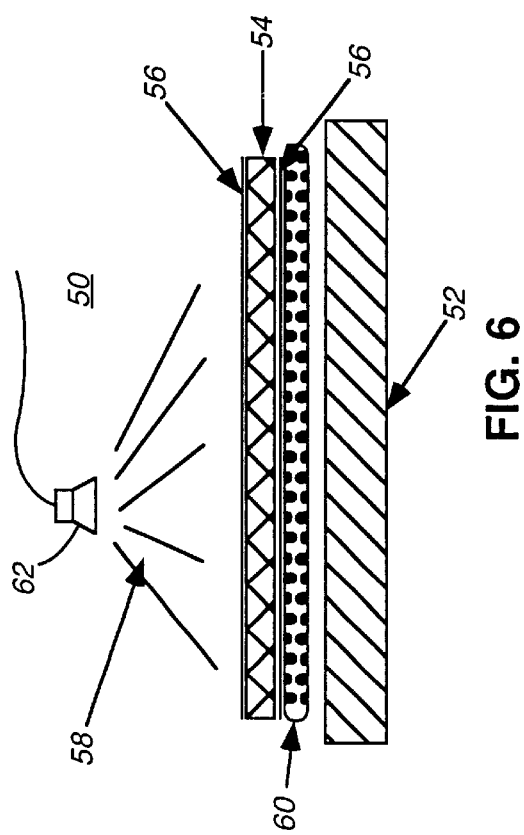
FIG. 6 is a side view of another embodiment of the elastic ground plane.
Figure 5:
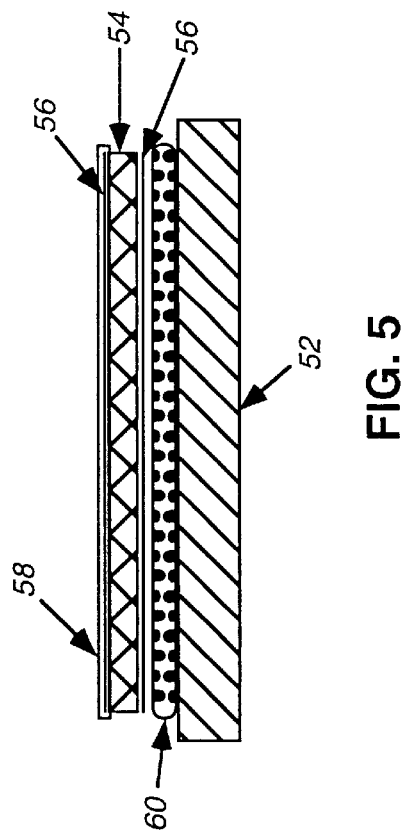
FIG. 5 is a side view of another embodiment of the elastic ground plane.

FIG. 5 shows an alternative embodiment of the elastic ground plane 50. In this embodiment the fabric (plurality of fibers) 54 only has the environmental coating 58 on the top surface of the fabric 54 (as opposed to encasing the fabric as in FIG. 4). The elastomeric adhesive is applied to a second surface of the fabric 54 or to the surface 52, to attach the elastic ground plane to the surface 52. FIG. 6 shows a third embodiment of a process for making and applying the elastic ground plane 50. In this embodiment the conductive fabric 54, 56 is prepared first. Next, the conductive fabric 54, 56 is cleaned with a solvent. Then an elastomeric adhesive 60 is applied to a surface 52 and the fabric 54 is placed on the adhesive 60. Last, the environmental elastomeric coating is applied by a sprayer 62.

Thus there has been described an elastic ground plane that can easily and significantly elongate in all direction, is highly conductive in all states of elongation, can withstand repeated elongations with no degradation in shielding effectiveness or material properties, is thin and light weight and which is tough enough to withstand severe aircraft environments.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An elastic ground plane comprising:
   an environmental coating;
   a fabric having a plurality of fibers capable of a minimum of 100% elongation, the fabric attached on a first surface thereof the environmental coating; and
   a conductive substance coating the fabric.

2. The elastic ground plane of claim 1, further including an adhesive applied to a second side of the fabric.

3. The elastic ground plane of claim 2, wherein the adhesive is an elastomer.

4. The elastic ground plane of claim 2, further including a reinforced elastomer attached to the adhesive.

5. The elastic ground plane of claim 1, wherein the environmental coating is an elastomer.

6. The elastic ground plane of claim 1, wherein the environmental coating is an elastomeric coating selected from the group of fluorosilicones, fluoroelastomers, silicones, thermoplastic elastomers and urethanes.

7. The elastic ground plane of claim 1, wherein the plurality of fibers include an elastic fiber.

8. The elastic ground plane of claim 1, wherein the fabric has a warp knit style weave.

9. The elastic ground plane of claim 1, wherein the conductive substance is a metal.

10. The elastic ground plane of claim 9, wherein the conductive substance is between 5 and 40 weight percent of the fabric.

11. An elastic conductive material, comprising:
    a plurality of fibers forming a plane wherein the plane is capable of 100% elongation;
    a conductive substance coating the plurality of fibers; and
    an elastomeric coating attached to a surface of the plane.

12. The elastic conductive material of claim 11, wherein a tensile moduli of the plane is less than 1000 pounds per square inch.

13. The elastic conductive material of claim 12, wherein a resistance is less than 0.8 Ohms per square throughout an operating range.

14. The elastic conductive material of claim 11, further including an elastomeric adhesive covering a side of the elastomeric coating.

15. An elastic ground plane adapted to be secured to a stretchable surface, the elastic ground plane comprising:
    a fabric having a plurality of fibers, the fabric being adapted to be secured to said stretchable surface and capable of elongation;
    a conductive substance coating the plurality of fibers;
    an environmental coating applied to at least a portion of a first surface of the fabric; and
    wherein the elastic ground plane is capable of a minimum of 100% elongation and is in accordance with that of the stretchable surface to which it is secured.

16. The elastic ground plane of claim 15, further including an adhesive applied to a second side of the fabric for securing the fabric to the stretchable surface.

17. The elastic ground plane of claim 16, wherein the adhesive is an elastomer.

18. The elastic ground plane of claim 15, wherein the environmental coating is an elastomeric coating selected from the group of fluorosilicones, fluoroelastomers, silicones, thermoplastic elastomers and urethanes.

19. The elastic ground plane of claim 15, wherein the plurality of fibers include an elastic fiber.

20. The elastic ground plane of claim 15, wherein the fabric has a warp knit style weave.

21. The elastic ground plane of claim 15, wherein the conductive substance is a metal.

22. The elastic ground plane of claim 21, wherein the conductive substance is between 5 and 40 weight percent of the fabric.

23. An elastic conductive material, comprising:
    a plurality of fibers forming a plane, capable of 100% elongation;
    a conductive substance coating the plurality of fibers; and
    an elastomeric coating attached to a surface of the plane and capable of elongation.

24. The elastic conductive material of claim 23, wherein a tensile moduli of the plane is less than 1000 pounds per square inch.

25. The elastic conductive material of claim 24, wherein a resistance is less than 0.8 Ohms per square throughout an operating range.

26. The elastic conductive material of claim 23, further including an elastomeric adhesive covering an other side of the elastomeric coating.

27. An elastomeric structure incorporating electromagnetic shielding, the structure comprising:
    an elastomeric substrate capable of a minimum of 100% elongation;
    a fabric having a plurality of fibers forming a panel, the fabric being securable to the elastomeric substrate and further being capable of a same degree of elongation in accordance with that of the elastomeric substrate; and
    a conductive substance coating the plurality of fibers such that the fibers provide an electromagnetic shielding effect to the elastomeric structure without impeding elongation of the fabric.

28. The elastomeric structure of claim 27, further comprising an environmental coating applied to at least a portion of a surface of the fabric.

29. The elastomeric structure of claim 27, further comprising an adhesive for securing the fabric to the elastomeric substrate.

30. The elastomeric structure of claim 28, wherein the environmental coating is comprised of an elastomeric coating of material from the group of fluorosilicones, fluoroelastomers, silicones, thermoplastic elastomers and urethanes.

* * * * *